United States Patent [19]

Amelio et al.

[11] Patent Number: 4,593,016

[45] Date of Patent: Jun. 3, 1986

[54] PROCESS FOR MANUFACTURING A CONCENTRATE OF A PALLADIUM-TIN COLLOIDAL CATALYST

[75] Inventors: William J. Amelio, Binghamton; Dae Y. Jung; Voya Markovich, both of Endwell; Carlos J. Sambucetti, Croton-on-Hudson, all of N.Y.

[73] Assignee: International Business Machines Corporation, Armonk, N.Y.

[21] Appl. No.: 701,585

[22] Filed: Feb. 14, 1985

[51] Int. Cl.$^4$ ................. B01J 23/14; B01J 23/44
[52] U.S. Cl. .................... 502/339; 502/227
[58] Field of Search ............. 502/339, 227; 106/1–11; 427/304

[56] References Cited

U.S. PATENT DOCUMENTS

| | | | |
|---|---|---|---|
| Re. 28,042 | 6/1974 | Rhodenizer et al. | 117/212 |
| 3,269,861 | 8/1966 | Schneble, Jr. et al. | 117/212 |
| 3,532,518 | 10/1970 | D'Ottavio | 502/339 X |
| 3,562,038 | 2/1971 | Shipley, Jr. et al. | 156/3 |
| 3,573,973 | 4/1971 | Drotar et al. | 117/212 |
| 3,632,388 | 1/1972 | Grumwald et al. | 117/47 A |
| 3,672,938 | 6/1973 | Zeblisky | 117/47 A |
| 3,904,792 | 9/1975 | Gulla et al. | 427/304 |
| 3,960,573 | 6/1976 | Zeblisky | 106/1 |
| 3,969,554 | 7/1976 | Zeblisky | 427/305 |
| 3,976,816 | 8/1976 | Fadgen et al. | 427/304 |
| 3,982,054 | 9/1976 | Feldstein | 427/299 |
| 4,008,343 | 2/1977 | Cohen et al. | 427/305 |
| 4,042,730 | 8/1977 | Cohen et al. | 427/305 |
| 4,066,809 | 1/1978 | Alpaugh et al. | 427/304 X |
| 4,284,666 | 8/1981 | Feldstein | 427/304 |
| 4,448,804 | 5/1984 | Amelio et al. | 427/98 |

OTHER PUBLICATIONS

Wang et al., "The Kinetics of PdCl$_2$/SnCl$_2$ Activating Solutions for Electroless Plating", *Plating and Surface Finishing*, Aug. 1982, pp. 59–61.

Rantell et al., "Mechanism of Activation of Polymer Surfaces by Mixed Stannous Chloride/Palladium Chloride Catalysts", *Transactions of the Institute of Metal Finishing*, vol. 51, Conference, 1973, Part 2, pp. 62–68.

R. L. Cohen, et al., Plating and Surface Finishing, pp. 52–55, "Sensitization With Palladium–Tin Colloids, I: Role of Rinse and Acceleration Steps".

*Primary Examiner*—W. J. Shine
*Attorney, Agent, or Firm*—Pollock, Vande Sande & Priddy

[57] ABSTRACT

A concentrate of a palladium-tin colloidal catalyst is obtained by dissolving stannous chloride in HCl, diluting the solution with HCl and then further diluting the solution with deionized water to thereby obtain a diluted stannous chloride solution. This solution is cooled to room temperature or below. A palladium chloride solution is obtained by dissolving palladium chloride in HCl which in turn is also cooled to room temperature or below. The palladium chloride solution is gradually added to the stannous chloride solution and mixed at about room temperature in order to obtain a homogeneous solution. The temperature of the solution is then gradually increased to about 105° C. to about 110° C. and maintained at that temperature for sufficient time to obtain a homogeneous solution of substantially uniform colloidal particles. The solution of colloidal particles is slowly cooled to about room temperature.

17 Claims, No Drawings

PROCESS FOR MANUFACTURING A CONCENTRATE OF A PALLADIUM-TIN COLLOIDAL CATALYST

DESCRIPTION

1. Technical Field

The present invention is concerned with producing a concentrate of a palladium-tin colloidal catalyst and is especially concerned with producing a concentrate which is suitable to produce catalyst or seeder compositions useful for preparing non-conducting surfaces for subsequent metal plating, and particularly electroless plating of a metal such as copper or nickel. The process of the present invention is especially suitable for obtaining a concentrate containing relatively finely dispersed palladium-tin colloidal particles of substantially uniform size and good stability.

2. Background Art

In the manufacture of printed circuit cards and boards, a dielectric sheet material is employed as a substrate. A conductive circuit pattern is provided on one or both of the major surfaces of the substrate.

A conductive pattern can be formed on the surface of the substrate using a variety of known techniques. These known techniques include the subtractive technique where a layer of copper is etched to form the desired circuit pattern, the EDB (electroless direct bond) technique where copper is electrolessly plated directly on the surface of the substrate in the desired pattern, and the peel-apart technique, where the desired circuit pattern is plated up from a thin layer of peel-apart copper. In any of these techniques connections between layers are made by means of plated through holes. In plating such holes, copper must be plated directly on the dielectric substrate (on the walls of the holes). Furthermore, if one uses the EDB technique, one must plate directly on the surface of the substrate.

Since the dielectric substrate is non-conductive, in order to plate on the substrate (either on the walls of the holes or on the surface of the substrate), the substrate must be seeded or catalyzed prior to the deposition of the metal onto the substrate.

Among the more widely employed procedures for catalyzing a substrate is the use of a stannous chloride sensitizing solution and a palladium chloride activator to form a layer of metallic palladium particles. For instance, one method for catalyzing a dielectric substrate is exemplified by U.S. Pat. No. 3,011,920, which includes sensitizing the substrate by first treating it with a solution of a colloidal metal, accelerating the treatment with a selective solvent to remove protective colloids from the sensitized dielectric substrate, and then electrolessly depositing a metal coating on the sensitized substrate; for example, with copper from a solution of a copper salt and a reducing agent.

Moreover, as suggested for example in U.S. Pat. No. 3,099,608, a dielectric substrate can be pretreated by depositing a thin film of a "conductivator type" of metal particle such as palladium metal from a semi-colloidal solution on the dielectric substrate to provide a conducting base which permits electroplating with conductive metal on the conductivated base. In addition, U.S. Pat. No. 3,632,388 suggests a method for treating a polymeric plastic substrate in a plating process which utilizes a preliminary chromic acid etch followed by one step activation in a tin-palladium hydrosol.

The foregoing discussed techniques, and especially use of a colloidal palladium-tin catalyst have been satisfactory for electroless or electroplating thin layers of conductive metals on non-conductive dielectric substrates for many prior art applications. However, as the demands for more complex circuitry increases and the requirements of quality of the plated metal likewise increase, the demands upon the quality of the catalyst has also increased. For instance, one recurring problem has been the existence of voids in through holes and/or poor adhesion or coverage of the dielectric substrate. The quality and ability of the catalyst to coat the substrate has a significant effect on the resulting quality of the plated metal.

One of the concerns with palladium-tin colloidal systems is that, in view of the nature of the system being colloidal, the technique employed in manufacturing the colloid has a significant effect upon the quality of the colloidal system. In fact, it has been experienced that seemingly relatively minor changes in manufacturing procedure actually resulted in catalyst or seeder composition which had significantly reduced ability to properly catalyze dielectric substrates for subsequent plating thereon. Accordingly, it would be desirable to provide a manufacturing process which reliably and repetitively provides a palladium-tin colloidal system of the quality necessary for the more demanding plating and higher quality products.

SUMMARY OF THE INVENTION

The process of the present invention provides for the manufacture of a concentrate of a palladium-tin colloidal catalyst of relatively uniform size, which has excellent catalytic activity and is readily reproducible. In addition, the concentrates formed from the present invention have relatively good stability and maintain their colloidal characteristics over relatively long periods of time, such as about six (6) months.

The process of the present invention comprises separately forming a diluted stannous chloride solution and a diluted palladium chloride solution prior to reacting them together to form the colloidal system. The stannous chloride solution is formed by dissolving a stannous chloride source calculated as about 550 grams to about 650 grams of $SnCl_2 \times 2H_2O$ per liter of concentrate in about 0.18 to about 0.21 liters of concentrated HCl to obtain a solution of stannous chloride. In other words, when the source of stannous chloride is $SnCl_2 \times 2H_2O$, the amount is about 550 to about 650 grams, but when it is a different material, the amount to be used is calculated so as to equal 550 grams to about 650 grams of $SnCl_2 \times 2H_2O$. The stannous chloride solution is diluted with concentrated HCl in order to obtain about 0.3 to about 0.5 liters of diluted solution per liter of final concentrate. The diluted solution is further diluted with deionized water to provide about 0.45 to about 0.55 liters of diluted solution per liter of final concentrate.

The palladium chloride solution is obtained by dissolving about nine (9) to about twelve (12) grams of $PdCl_2$ per liter of the concentrate in aqueous HCl to obtain a $PdCl_2$ solution containing about 0.04 to about 0.06 liters of HCl per liter of concentrate and to obtain about 0.35 to about 0.45 liters of palladium chloride solution per liter of concentrate.

Both the stannous chloride solution and the palladium chloride solution are cooled to normal room temperatures (25° C. ±3° C.) or below. The palladium chloride solution is then gradually added to the diluted stannous chloride solution and mixed to obtain a homogeneous solution. The temperature of the solution is then slowly increased at a rate of about 0.5° C. to about 1° C. per minute until a temperature of about 105° C. to about 110° C. is reached. The solution is held at the temperature range of about 105° C. to about 110° C. for a time sufficient to obtain a homogeneous solution of substantially uniform colloidal particles. This solution is slowly cooled to about room temperature.

DESCRIPTION OF BEST AND VARIOUS MODES FOR CARRYING OUT INVENTION

The stannous chloride solution which is employed in accordance with the present invention is prepared by dissolving a source of stannous chloride calculated as about 500 grams to about 650 grams, and preferably about 600 grams of $SnCl_2 \times 2H_2O$ in about 0.18 to about 0.21 liters of concentrated aqueous HCl per liter of final concentrate to obtain a solution of stannous chloride. The concentrated aqueous HCl is preferable ACS reagent grade concentrated HCl which normally has about 35 to about 39% by volume and most preferably about 37% by volume of HCl. It is important to employ concentrated HCl to form the stannous chloride solution in order to insure against the hydrolysis of stannous ions to stannic ions.

The solution is formed by mixing, such as using an immersion mixer, and preferably by a relatively uniform and slow mixing procedure. For instance, it is preferred to set the mixer at its lowest setting which is about 5 to about 25 RPM, and preferably at about 5 to about 10 RPM. The uniform slow mixing is preferred in order to help prevent oxidation of the stannous ions to stannic ions in the solution.

After the stannous chloride is totally dissolved, as indicated by obtaining a clear solution, the solution is diluted with concentrated aqueous HCl to obtain about 0.3 to about 0.5 liters of diluted solution per liter of final concentrate. The concentrated HCl is preferably ACS reagent grade concentrated HCl.

The additional HCl added in this stage is in order to assure that the solution of stannous chloride has the desired acidity. The concentrated HCl is added in multiple steps so as to further assure against hydrolysis of stannous ions to stannic ions, since employing a greater amount of liquid in the first step increases the possibility of such hydrolysis.

Next, the diluted solution is further diluted with deionized water in order to reduce the chloride ion content to avoid possible chloride undercutting when the final colloidal composition is used to catalyze dielectric substrates. In particular, too high a concentration of chloride ions in solution tends to cause some dissolution of certain dielectric substrates (e.g., epoxy resins) and particularly that in the plated through holes. The solution is diluted with deionized water to obtain about 0.45 to about 0.55 and preferably about 0.5 liters of diluted stannous chloride solution per liter of final concentrate. The solution also at this stage should be clear. If not, the solution may contain undesirable amounts of stannic ($Sn^{+4}$) in the solution. The diluted stannous chloride solution is preferably stored for a time sufficient to insure that such has reached substantial equilibrium, which usually takes from about 1 to about 2 hours. It is preferred not to permit the stannous chloride solution to be stored for greater than about 2 hours in order to prevent the formation of stannic ions in the solution.

The palladium chloride solution is prepared by dissolving about 9 to about 12 grams, and preferably about 10 to about 11 grams of $PdCl_2$ per liter of concentrate in aqueous HCl to obtain a palladium chloride solution containing about 0.04 to about 0.06 and preferably about 0.05 liter of HCl per liter of concentrate and to thereby obtain about 0.3 to about 0.5 liters and preferably about 0.4 liters of the palladium chloride solution per liter of concentrate.

The preferred palladium chloride employed is reagent grade palladium chloride which is free from any organic impurities.

The palladium chloride solution is preferably prepared by first dissolving the $PdCl_2$ in about 0.15 to about 0.16 liters of concentrated aqueous HCl per liter of concentrate. The preferred HCl employed is ACS reagent grade concentrated HCl. In addition, it is preferred that the palladium chloride be mixed in the solution by a steady slow mixing procedure, such as employing an immersion mixer, preferably at its lowest setting, such as 5 to about 25 RPM, and preferably at about 5 to about 10 RPM.

After the palladium chloride is completely dissolved, the solution is then preferably diluted with deionized water to obtain the desired volume of diluted palladium chloride.

The diluted palladium chloride solution is preferably stored for about 1 to about 2 hours in order to insure that the solution has achieved equilibrium.

The diluted stannous chloride solution and the diluted palladium chloride solution are cooled to normal room temperatures (about 25° C.±3° C.) or below. The minimum temperature to which the solutions should be cooled should be above the freezing temperature of the solution and is generally no lower than about −10° C. The solutions are cooled in order to prevent premature reaction between the stannous chloride solution and palladium chloride solution upon mixing. This insures that the final colloidal suspension is substantially uniform and homogeneous.

The palladium chloride solution is then gradually added to the diluted stannous chloride solution at the above reduced temperatures. It is essential that the palladium chloride be added to the stannous chloride in order to avoid having an excess of palladium ions per stannous ions in the solution to avoid forming palladium metal without first forming the palladium-tin colloid. The palladium chloride solution is gradually added to the stannous chloride solution at a rate usually no greater than about 1.5 liters of palladium chloride solution per minute, while agitating, preferably at a steady, slow mixing rate, such as using an immersion mixer set about about 5 to about 25 RPM, and preferably at about 5 to 10 RPM. The preferred rate of addition is about 1 liter of palladium chloride solution per minute.

In order to insure that the solution is homogeneous in order to prevent premature reaction, such is preferably mixed at the above-mentioned temperatures (room temperature or below) at a continuous slow rate (immersion mixer setting at about 5 to about 25 RPM, and preferably at 5 to 10 RPM) for about ½ to about 1½ hours and preferably about 1 hour.

Next, the temperature of the composition is raised to about normal room temperature, if need be, and gradually raised therefrom to about 100° C. to about 110° C. at a rate of about 0.5° C. to about 1° C. per minute, and preferably at a rate of about 0.7° C.

The solution is maintained at the above temperature range of about 105° C. to about 110° C. for a time sufficient to insure completion of the reaction to provide a homogeneous solution of substantially uniform palladium-tin colloidal particles. This usually takes about 1½ to about 2½ hours, and preferably about 2 hours for a 40 gallons batch. The time may be adjusted upwardly or downwardly depending upon the size of the batch.

Next, the solution is slowly cooled to about room temperature at a rate of about 5° C. or less, usually about 0.1° C. to about 5° C., and preferably about 1° C. to about 5° C. per minute. For instance, using a 40 gallon batch as an example, the cooling can be conducted by permitting the batch to sit overnight. It is important not to cool the batch too quickly, such as using a water jacket cooling or similar quick cooling procedure.

If desired, about 0.24 to about 0.28 liters of aqueous solution of a non-ionic surfactant per liter of concentrate can be added to the reacted solution of substantially uniform palladium-tin colloidal particles after such has been cooled to at least about room temperature.

The aqueous solution contains about 10 to about 150 grams and about 100 to about 120 grams of the non-ionic surfactant. Preferred non-ionic surfactants are the fluorocarbons, such as those available under the trade designations FC-95 which is a potassium perfluoroalkyl sulfonate.

The aqueous solution of the non-ionic surfactant can be prepared by dissolving the surfactant in deionized water at about normal room temperatures.

The concentrate prepared in accordance with the present invention is composed of substantially uniform colloidal particles, and is stable over relatively long periods of time in the form of the concentrate such as at least about 6 months.

Prior to use, the concentrates are diluted in sodium chloride solutions as is well known in the art, and are diluted at ratios of about 5° C. to about 20:1 and preferably about 10:1. The concentrates prepared by the present invention are suitable to prepare catalysts when diluted which are readily reproducible and provide the necessary characteristics for the subsequent plating operations.

Having thus described our invention, what we claim as new and desire to secure by Letters Patent is:

1. Process for the manufacture of a concentrate of a palladium-tin colloidal catalyst which comprises:
(a) dissolving a source of stannous chloride calculated as about 550 grams to about 650 grams of $SnCl_2 \times 2H_2O$ per liter of said concentrate in about 0.18 to about 0.21 liters of concentrated aqueous HCl per liter of said concentrate to thereby obtain a stannous chloride solution;
(b) diluting said stannous chloride solution obtained from step (a) with aqueous concentrated HCl to thereby obtain about 0.3 to about 0.5 liters of diluted solution per liter of said concentrate;
(c) further diluting said diluted solution from step (b) with deionized water to provide about 0.45 to about 0.55 liters of diluted stannous chloride solution per liter of said concentrate;
(d) dissolving about 9 to about 12 grams of $PdCl_2$ per liter of said concentrate in aqueous HCl to obtain a $PdCl_2$ having about 0.04 to about 0.06 liters of HCl per liter of said concentrate to thereby obtain about 0.35 to about 0.45 liters of diluted palladium chloride solution per liter of concentrate;
(e) cooling the solution from steps (c) and (d) to normal room temperatures or below;
(f) gradually adding the diluted palladium chloride solution cooled pursuant to step (e) to the diluted stannous chloride solution cooled pursuant to step (e), and mixing to obtain a homogeneous solution;
(g) then increasing the temperature of the homogeneous solution from step (f) from about normal room temperatures at a rate of about 0.5° to about 1° C. per minute until a temperature of about 105° C. to about 110° C. is reached and held at said temperature for a time sufficient to obtain a homogeneous solution of substantially uniform colloidal palladium-tin particles; and
(h) slowly cooling said homogeneous solution to about room temperature.

2. The process of claim 1 which comprises dissolving about 600 grams of $SnCl_2 \times 2H_2O$ per liter of said concentrate in step (a).

3. The process of claim 1 wherein said concentrated HCl contains about 35 to about 39% by volume of said HCl.

4. The process of claim 1 wherein said concentrated HCl contains about 37% by volume of HCl.

5. The process of claim 1 wherein the diluted stannous chloride solution is stored for a maximum of about 2 hours prior to mixing with said diluted palladium chloride solution.

6. The process of claim 1 which comprises dissolving about 10 to 11 grams of $PdCl_2$ per liter of said concentrate in step (d).

7. The process of claim 1 whereby said diluted palladium chloride solution contains about 0.05 grams of HCl per liter of concentrate.

8. The process of claim 1 whereby the $PdCl_2$ employed is free from any organic impurities.

9. The process of claim 1 wherein said diluted palladium chloride solution is prepared by dissolving $PdCl_2$ in about 0.15 to about 0.16 liters of concentrated aqueous HCl per liter of concentrate, and then diluting with deionized water.

10. The method of claim 1 wherein said diluted palladium chloride solution is added to said diluted stannous chloride solution at a rate no greater than about 1.5 liters of palladium chloride solution per minute.

11. The process of claim 1 wherein said diluted palladium chloride solution is added to said diluted stannous chloride solution at a rate no greater than about 1 liter per minute.

12. The process of claim 1 wherein the temperature in step (g) is increased to about 105° C. to about 110° C. at a rate of about 0.7° C.

13. The process of claim 1 whereby the solution is held at the temperature of about 105° C. to about 110° C. for about 1½ to about 2½ hours.

14. The process of claim 1 wherein the solutions are held at a temperature of about 105° C. to about 110° C. for about 2 hours.

15. The process of claim 1 which further includes adding about 0.24 to about 0.28 liters of a non-ionic surfactant to the homogeneous solution obtained from step (h).

16. The process of claim 15 wherein said non-ionic surfactant is a fluorocarbon.

17. The process of claim 1 wherein said source of stannous chloride is $SnCl_2 \times 2H_2O$.

* * * * *